3 Sheets--Sheet 1

T. W. LANE.

Steam-Gages.

No. 5,320.

Reissued March 11, 1873.

*Witnesses.*

Wm. G. Henderson.

*Inventor.*

Thos. W. Lane by A. Bruce atty

3 Sheets--Sheet 2.

T. W. LANE.

Steam-Gages.

No. 5,320. Reissued March 11, 1873.

*Witnesses*

*Inventor.*

Thos. W. Lane by
A. Pollock atty

3 Sheets--Sheet 3.

T. W. LANE.

Steam-Gages.

No. 5,320.

Reissued March 11, 1873.

*Witnesses.*

John Quincey

Wm. H. Anderson

*Inventor.*

Thos. W. Lane by

A. Bollok atty.

UNITED STATES PATENT OFFICE

THOMAS WILSON LANE, OF MEREDITH, NEW HAMPSHIRE.

IMPROVEMENT IN STEAM-GAGES.

Specification forming part of Letters Patent No. 23,032, dated February 22, 1859; extended seven years; reissue No. 5,320, dated March 11, 1873.

*To all whom it may concern:*

Be it known that I, THOMAS WILSON LANE, of Meredith, in the county of Belknap and State of New Hampshire, have invented certain new and useful Improvements in Steam-Pressure Gages, of which the following is a full, clear, and exact description, reference being had to the accompanying drawing making part of this specification, in which—

Figure 1:
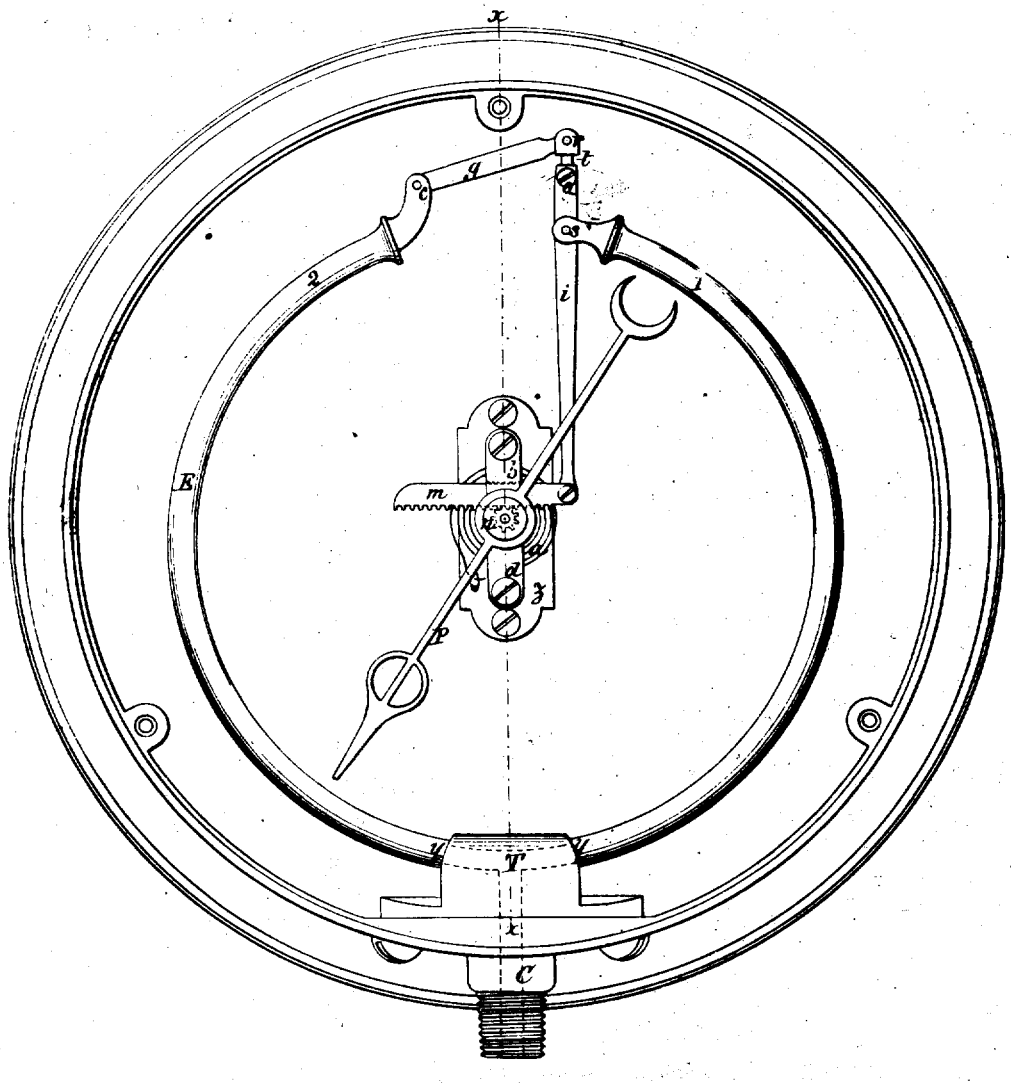
Figure 2:
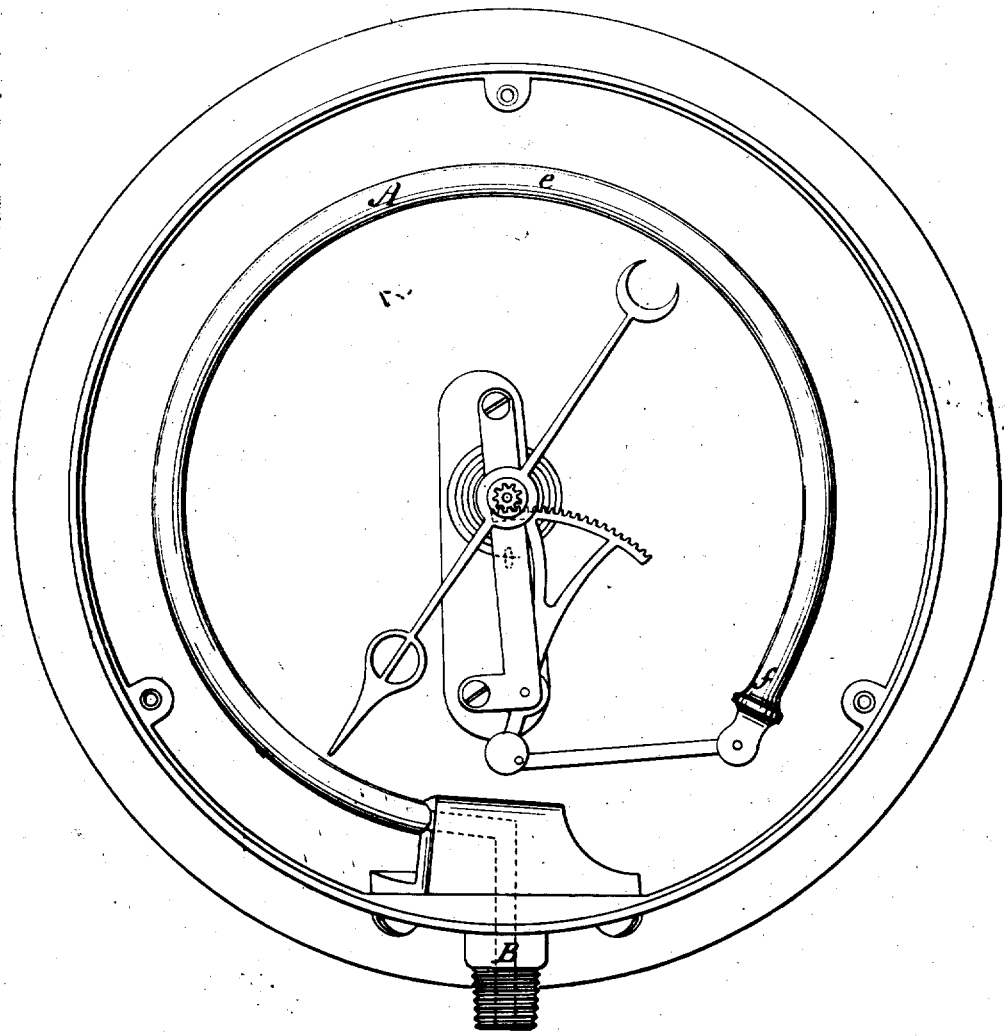
Figure 3:
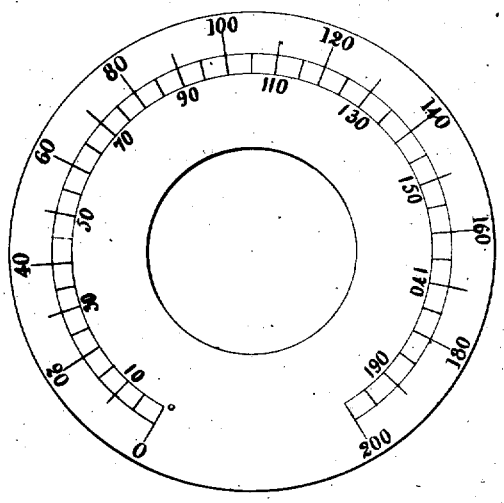
Figure 4:
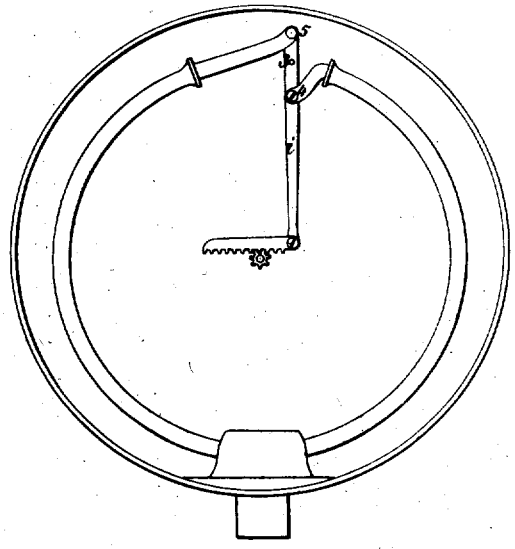

Figure 1 is a view of my improved gage, the dial-plate being removed to show the interior of the gage; Fig. 2, a similar view of the Bourdon steam-gage as heretofore constructed; Fig. 3, the dial-plate on a reduced scale. Fig. 4 will be referred to hereafter.

Steam-gages in which the pressure of steam within a boiler is measured by the alteration of form of a flattened tube are preferable on many accounts to any other form of gage thus far constructed or introduced. They are sensitive to light pressures, and are not liable, when properly made, to be ruptured or "set" by the heaviest pressures which they are called upon to endure. They are, however, liable to some objections, which are due not to their principle of action, but to faults in the construction and arrangement of their parts.

In Fig. 2 of the accompanying drawing is represented a gage of this description of the usual construction, the bent tube A being attached, at one extremity, to the pipe B, through which the pressure within the boiler is transmitted to the interior of the tube. When thus constructed, if the bent tube exceeds a semicircle in length, a portion of the tube (as from *e* to *f*, Fig. 2,) hangs down below the point *e*, so as to form a receptacle in which water soon accumulates from the condensation of vapor within it. The water thus collected is liable to freeze in winter, by which the indicating-tube is often burst or strained.

When used upon locomotives the gage represented in Fig. 2 is liable to another serious objection arising from the violent shocks and jarring to which the engine is subjected as it passes over the road. These shocks are of a twofold character: First, those which are occasioned by obstacles encountered by the treads of the wheels, (as the ends of rails, &c.,) and which occur in directions nearly vertical. Second, those which are occasioned by the swaying of the engine from side to side, and by the striking of the flanges or fillets of the wheels against the sides of the rails, and which occur in horizontal directions.

It has been attempted to remedy the difficulties above stated by securing the indicating-tube to the gage at a point between the two ends and near the center of said tube, the two portions of the tube being bent symmetrically, or nearly so, upon opposite sides of a vertical line passing through the junction of the tube with the pipe from the boiler, and being connected with a transmitting-lever, *i*, pivoted to the case of the gage, as shown, for instance, in Fig. 4. While this arrangement of the tube will prevent the gathering of water in its ends, and while the connecting the two ends of the tube to the lever will serve to prevent or reduce to a greater extent the transmission of tremulous movement to the index, yet the pivoting of the transmitting-lever *i* to the case is productive of serious disadvantages.

When the lever is pivoted to the case, as seen at 3 in Fig. 4, then one branch of the tube will be just as efficacious to move the lever as the two branches. Supposing the branches to be connected with the lever at points 4 and 5, equidistant from and on opposite sides of the pivot 3, if the two branches be of equal tension or elasticity—that is to say, if they expand or move alike and in unison when under pressure—then at a certain degree of pressure each branch will move outwardly the same distance as the other, and the two together will move the transmitting-lever just as far and no further than the lever would be moved if but one, and one only, of the branches were connected therewith. It is, however, practically very difficult, if not impossible, to obtain two branches of equal power and capacity, and the one is very apt to expand more or less, as the case may be, than the other under the same pressure—as, for instance, the united action of the two upon the lever at a certain pressure would move the index or pointer to, say, 100 degrees on the dial, while taken separately under the same pressure the one branch might move the index only to between 80 degrees and 90 degrees, and the other would move the index as far as between 110 degrees and 120 degrees. The 100 degrees marked by the index under the conjoined action of the two branches is therefore the mean between the two forces, and a portion of the power of the branch which has the greatest expansibility is thus expended upon the more sluggish branch. The two branches, consequently, are entirely dependent upon each other. The movement of the one is regulated and determined by and must accord with that of the other, and each branch must move just as far to indicate a certain pressure as it would be compelled to move were it alone and singly doing the work.

It is manifest that there is here an expenditure of power and movement of the tube entirely disproportionate to the effect produced, and which must soon result in damage to the tube by impairing its efficiency and soon causing it to "set," in which event it becomes useless.

In addition to the disadvantages above stated as attending the pivoting of the lever to the case, there are other objections to the arrangement shown in Fig. 4, which may be briefly noted: First, it will be difficult to adjust the points of attachment 4 and 5 so as not to cause the pivot 3 to bind in its bearings; second, the jarring of the indicating-tube, whether in a vertical or horizontal direction, brings great strain and wear upon the pivot 3, whereby it or its bearings are soon worn; third, the effect upon the index-hand of the looseness of parts thus produced, as well as of the jarring of the tube, is greatly increased by the shortness of the distance between the pivot 3 and the points 4 and 5.

In order, therefore, to render practically available a tube secured to the gage at a point between its ends, as above described, it becomes necessary to devise a way in which the full power of both branches may be utilized, and in such manner that each may perform its work independently of the other. This is the object of my invention, which may, in general, be stated to consist in combining, with the two branches of the indicating-tube, a transmitting-lever, pivoted to the one branch and linked to the other by an arm jointed to the parts which it connects, substantially as hereinafter described. The lever, under this arrangement, is carried by the tube, and has no connection with the case of the gage, and it therefore has no fixed and stationary point of oscillation. The branches are thus free to act independently of each other, each branch operating to supplement the work of the other, and exerting its power without restraint and to the full upon the lever.

In Fig. 1 of the accompanying drawing is represented my improved gage, the dial-plate (seen detached in Fig. 3) being removed to show the parts within. The pipe C, through which the pressure is brought from the boiler, is attached to the indicating-tube E at T. The two branches 1 and 2 of the indicating-tube are made of a length not exceeding a semicircle, while they are both so placed as to descend at every point toward their junction with the pipe C, that the water which may condense within the tube may drain back to the pipe. To diminish, as far as possible, the vertical vibrations of the indicating-tube, and to lessen their influence upon the index-hand, the pipe C is joined with the tube at a point, T, between its two extremities, and the two branches 1 and 2 are bent upon opposite sides of the vertical line *x x*, passing through the point T, the extremities of the tube being nearly over the points *y y*, where the tube is rigidly supported. The lever *i*, through which the contracting and expanding motion of the tube is transmitted to the index-hand, is pivoted to one of the branches, 1, of the tube at *s*, the extremity of this lever being pivoted at *r* to a connecting-arm, *g*, the other end of which is pivoted at *c* to the branch 2 of the tube. The lower end of the lever *i* is pivoted at *v* to the rack *m*, which engages with a pinion, *n*, upon the arbor of the index-hand P.

When thus constructed and connected it will be observed that, upon the occurrence of a shock in a horizontal direction, both branches of the tube move equally, or very nearly so, in the same direction, carrying with them the upper end of the lever *i*, which, not being pivoted to the case or other rigid part of the gage, simply turns round the point *c* without influencing the rack *m* or the index-hand.

By hanging the lever *i* upon one of the branches of the indicating-tube, as before described, in lieu of rigidly pivoting it to the case, I overcome all the difficulties and disadvantages hereinbefore mentioned, and am enabled to avail myself of the aggregate motion of the branches 1 and 2 of the tube, while the short arm of the lever *i* may be made of double the length which it would be necessary to have if this lever were pivoted to the case, the point *r* serving as fulcrum for the motion imparted to the lever by the branch 1 of the tube, and the point *s* as fulcrum for the motion imparted to it by the branch 2. The aggregate motion of the two branches of the tube is thus made available, each branch acting independently and supplementing the work of the other. By increasing the length of the short arm of this lever I am enabled thereby to greatly diminish the vibration of the index-hand when the indicating-tube is subjected to jars.

The extremity of the lever *i*, to which is pivoted the connecting-arm *g*, Fig. 1, is made in a separate piece, *t*, which is fitted to slide into the body of the lever *i*, and is secured in the required position by the screw *o*, by which means the distance between the pivots *r* and *s* may be varied. A delicate coiled spring, *a*, one end of which is attached to the bottom plate *z* and the other to the pinion *n*, serves to keep the teeth of the latter pressed against one side of the teeth of the rack *m*. The rack *m* is prevented from being raised by any sudden jar and disengaged from the teeth of the pinion *n* by a shoulder on the top plate *d*, seen dotted at *b*, Fig. 1.

What I claim as my invention, and desire to secure by Letters Patent, is—

The combination, with the two branches of the indicating-tube, secured in the gage in the manner herein described—that is to say, so that each branch shall not exceed a semicircle in length, the whole tube being placed in such position that it shall descend at every point toward and drain back into the pipe from the boiler—of a lever transmitting the movement of the tube to an indicating mechanism, the lever being pivoted to the one branch and linked to the other by an arm jointed to the parts which it connects, without any attachment to the case or other rigid part of the gage, substantially as shown and set forth.

T. W. LANE.

Witnesses:

A. POLLOK,

M. BAILEY.